R. A. ERWIN & W. R. LONG.
COTTON CHOPPER.
APPLICATION FILED APR. 16, 1910.

992,412.

Patented May 16, 1911.
4 SHEETS—SHEET 4.

Witnesses
J. G. Hinkel
J. H. Bruninga.

Inventor
Robert A. Erwin
By Wallas R. Long
Foster, Freeman, Watson & Coit
Attorneys

UNITED STATES PATENT OFFICE.

ROBERT A. ERWIN AND WALLAS R. LONG, OF ROCKHILL, SOUTH CAROLINA.

COTTON-CHOPPER.

992,412.

Specification of Letters Patent.  Patented May 16, 1911.

Application filed April 16, 1910.  Serial No. 555,950.

*To all whom it may concern:*

Be it known that we, ROBERT A. ERWIN and WALLAS R. LONG, citizens of the United States, and residents of Rockhill, county of York, State of South Carolina, have invented certain new and useful Improvements in Cotton-Choppers, of which the following is a specification.

This invention relates to machines for chopping or blocking out cotton or other plants which are planted in rows.

One of the objects of this invention is to construct a chopper frame which can be raised and lowered to adjust the depth of cut.

Another object is to provide a construction in which this frame can be raised and lowered to lift the chopping mechanism out of the soil.

Another object is to connect this frame to the main frame in a simple and effective manner and to provide driving mechanism which will permit adjustment of this frame.

Another object is to provide a simple and effective means for throwing the driving mechanism for the chopper into and out of gear.

Another object is to provide a chopping mechanism which can be easily adjusted so as to vary the amount of soil chopped out and thus the distance apart of the plants.

Another object is to provide a chopper which can be easily changed into a cultivator.

Another object is to provide in connection with the chopping mechanism a novel harrow which can be adjusted and raised out of the ground.

Further objects will appear from the detailed description.

The invention will be described in connection with the accompanying drawings, in which—

Figure 1:
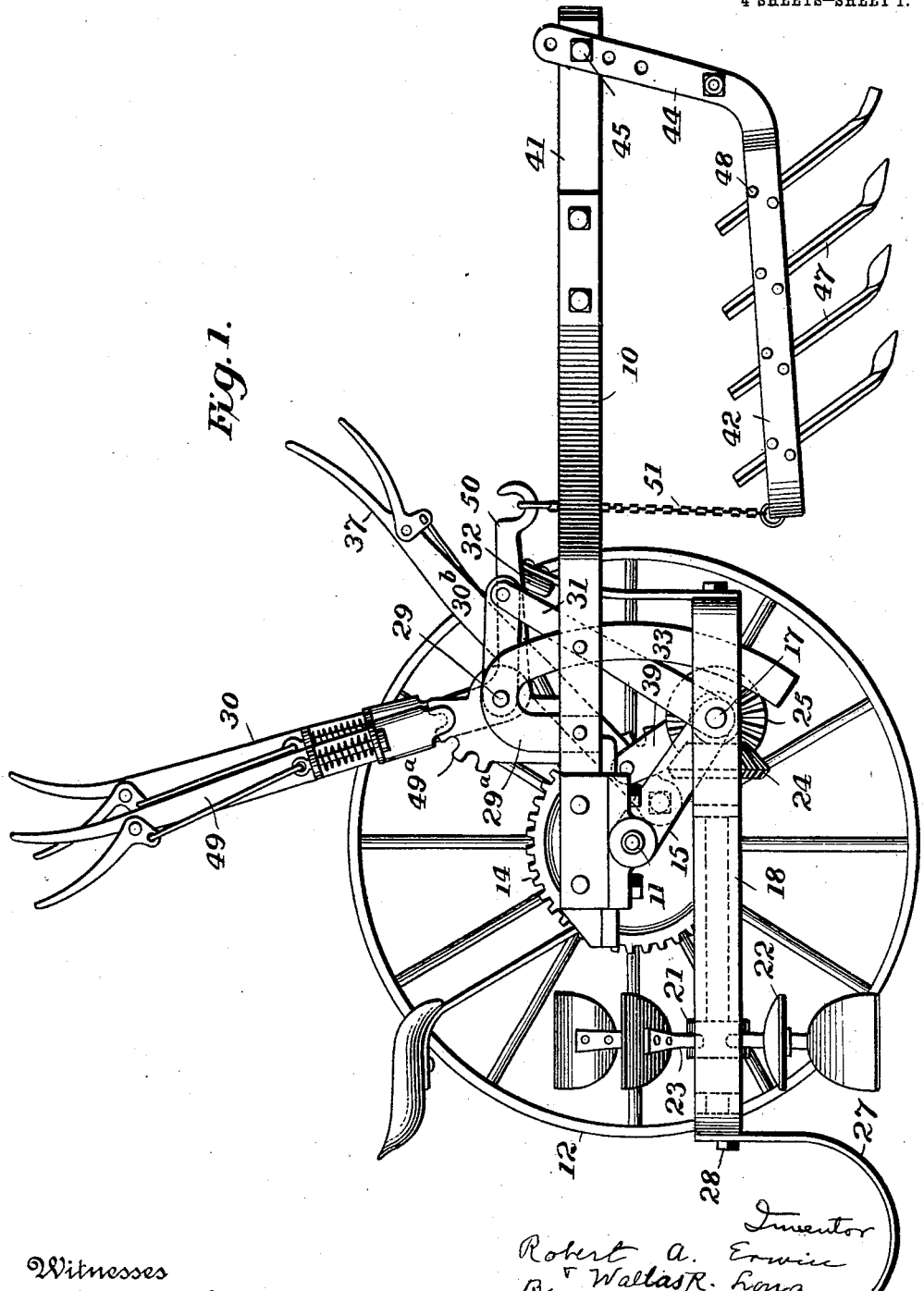
Figure 2:
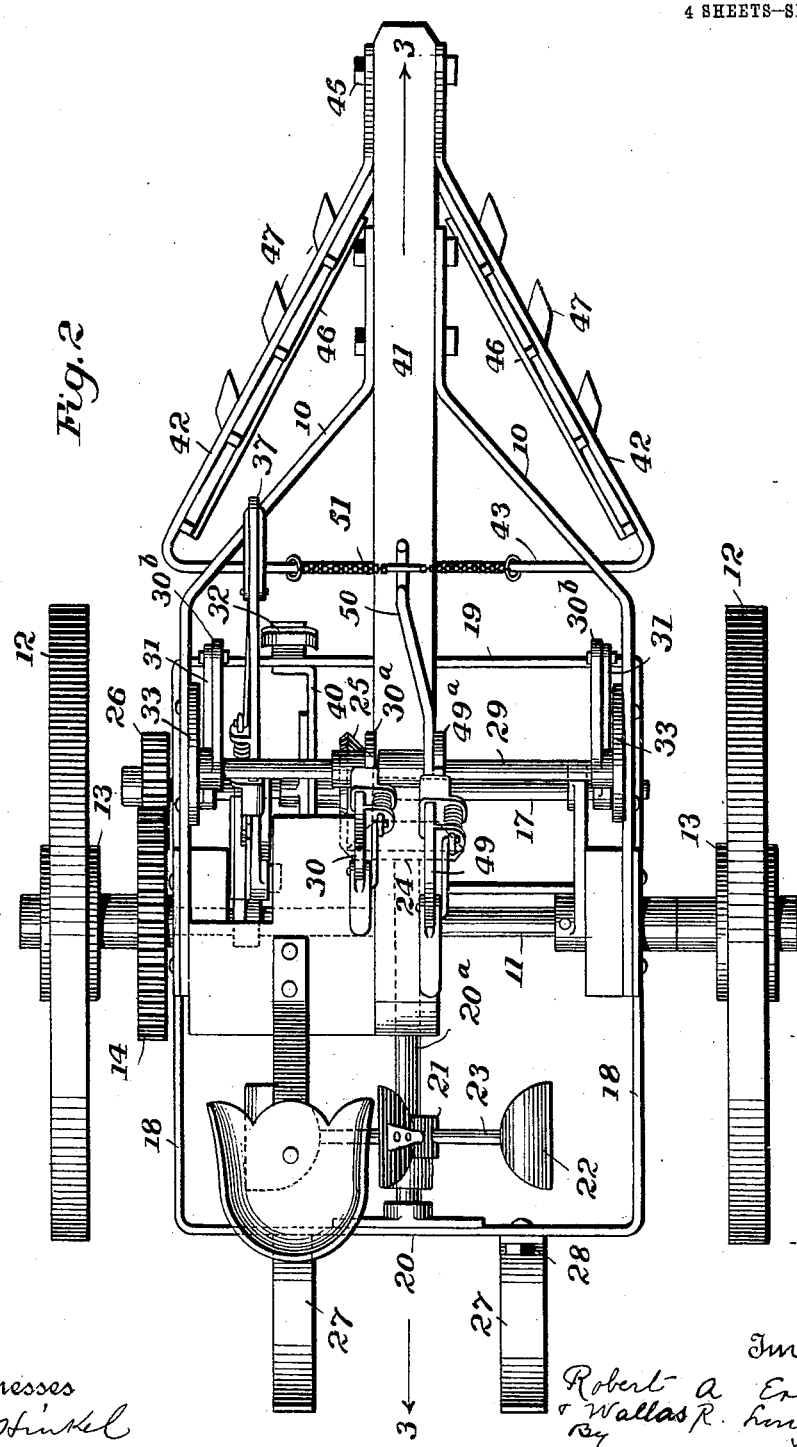
Figure 3:
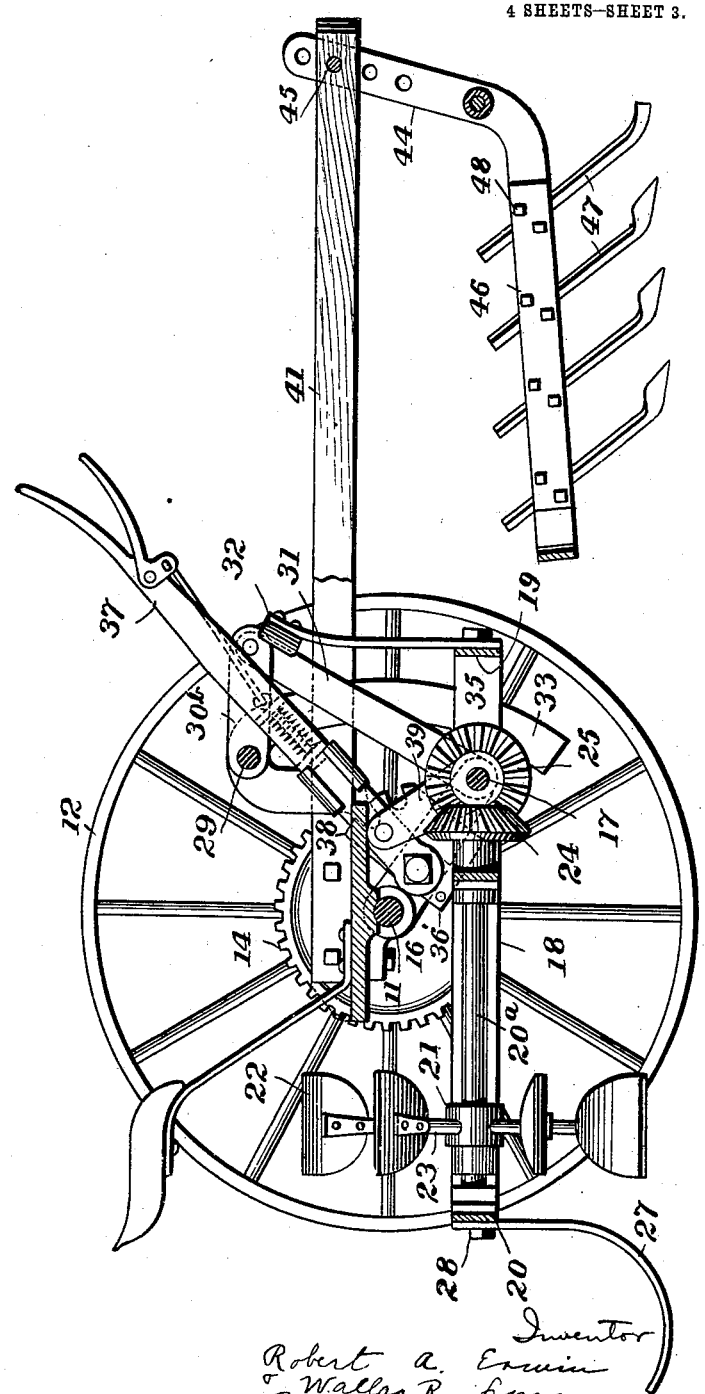
Figure 4:
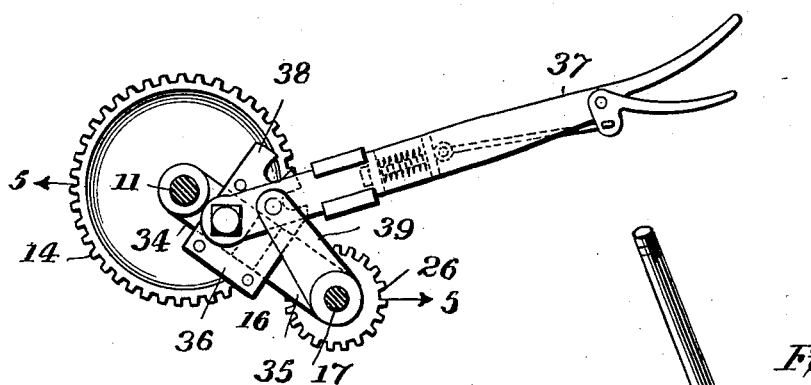
Figure 7:
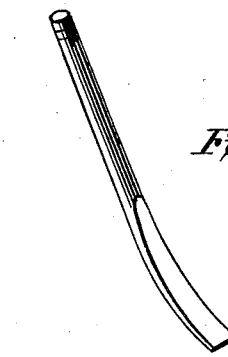
Figure 5:
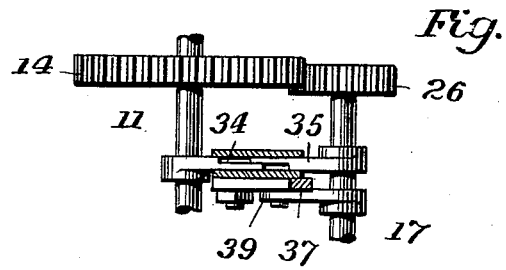
Figure 6:
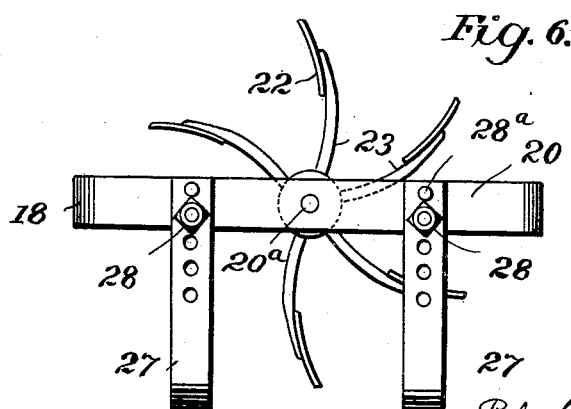

Figure 1 is a side elevation of the machine; Fig. 2 is a plan view of the machine; Fig. 3 is a section on the line 3—3 Fig. 2; Fig. 4 is a detail view of the mechanism for throwing the chopper into and out of gear; Fig. 5 is a section on line 5—5 Fig. 4; Fig. 6 is a rear view of the chopper frame showing the chopping wheel and the shoes; Fig. 7 shows a modified form of cutter or tooth which can be used with this invention.

The frame work of this machine is preferably constructed of structural iron or steel, and comprises in general a main frame 10, supported on an axle 11, which runs crosswise of the machine. A pair of driving wheels 12 are mounted on this axle, the connection between the axle and wheels being made through the medium of suitable differential devices 13 of known construction. The axle is here shown as a live axle, and has secured to it a driving gear 14.

A pair of links 15 are loosely mounted upon the axle and support at their lower ends a shaft 17, which is mounted for rotation in these links. A chopper frame comprising side members 18 and front and rear cross members 19 and 20 is mounted upon the shaft 17 so as to swing thereon as an axis. A shaft 20ª extends longitudinally of the frame and is mounted to rotate in bearings therein. This shaft has rigidly connected thereto a chopping wheel comprising a hub 21 and shanks 23 which have a screw threaded connection with this hub. These shanks have secured thereto chopping blades 22. The forward end of the shaft 20ª has rigidly secured thereto a bevel pinion 24, which meshes with a driving bevel gear 25 rigidly connected to the shaft 17. The shaft 17 has rigidly connected to it a pinion 26 which meshes with the driving gear 14. By means of the above train of mechanism the chopping wheel is driven from the driving wheels 12. The rear cross member 20 has secured thereto a pair of shoes 27, the connection being made by means of bolts 28 extending through holes in the shoes and dowel pins 28ª on 20 engaging the holes. The shanks of these shoes are preferably provided with a number of holes, shown in Fig. 6, so that the height of these shoes may be adjusted. It will be understood that the shoes 27 are made of resilient material and form yielding supports.

A shaft 29 is mounted for rotation in a pair of side members 29ª bolted or riveted to the main frame 10. This shaft has rigidly secured to it an operating lever 30 coöperating with a segment 30ª. The shaft 29 has also rigidly secured to it a pair of arms 30ᵇ, and links 31 connect these arms to the forward end of the chopper frame. In the specific construction shown these links are connected at the lower end to the shaft 17. The forward cross member 19 has secured to it a foot piece 32. The side members 29ª extend downwardly forming brace and guide members or sectors 33, which brace and guide the chopper frame in its movements.

The link 15 is preferably rigid throughout, but the link 16 is of sectional construction and comprises sections 34, 35. The section 34 has rigidly secured thereto a member 36 composed of side plates which forms a socket in which the section 35 may slide. An operating lever 37 is pivotally connected to the section 34 by a bolt which passes through the member 36 and the section 34, one of the plates of the member 36 being extended upwardly to form a segment 38. A link 39 connects the section 35 with the operating lever. In the specific construction shown this link is connected to the shaft 17. An additional brace member 40 is provided with a bearing to give additional rigidity to the frame and the live shaft 17.

The main frame is provided with an extension 41, to which a standard tongue may be secured so that the machine may be drawn by horses. A harrow of triangular construction comprises rearwardly diverging side members 42 and a cross member 43. The forward ends of the side members terminate in upwardly extending arms 44, which are provided with a plurality of holes by means of which the harrow may be adjustably secured to the extension 41 by a bolt 45 passing through the extension and the holes in the arms. Clamping plates 46 are located on the inside of the side members 42, and the harrow teeth 47 are clamped between the side members and the clamping plates by means of bolts 48. An operating lever 49 is loosely mounted on a shaft 29 and coöperates with a segment 49ª. This operating lever has connected thereto an arm 50, the forward end of which is connected to the rear end of the harrow frame by means of chains 51.

The chopper wheel is driven from the driving wheels by means of the train of gearing substantially as described. This chopper frame is pivoted at its forward end and the chopper wheel and the shoes 27 are located rearwardly of the axle 11. By means of this construction the chopper frame will drag and thus will adapt itself readily to the inequalities in the soil. The shoes 27 gage the depth of the cut, and this depth can be easily varied by means of the operating lever 30 and its connections. It will be noted that the operating lever is connected to the forward end of the chopper frame and thus will swing the chopper frame about the shoes as an axis. By means of this construction only a slight effort is required to adjust the position of the chopper frame, and therefore the depth of the cut. In order to further regulate the depth of the cut the position of the shoes on the frame may be varied. By means of the foot piece 32 the frame may at any time be tipped so as to raise the chopper and the shoes out of the ground.

The width of the chopper blades, the speed of rotation of the chopper and the forward movement of the chopper as a whole with the machine, are so proportioned that the cuts made by the blades overlap. This insures that the cut will be a continuous one and that none of the plants will be skipped between successive blades. It will be noted that one of the chopper blades is omitted so as to leave a wide gap between two successive blades, and in this way certain of the plants are skipped so that bunches of plants will remain standing at certain intervals. The distance apart of these plants may be varied by varying the speed of rotation of the wheel; that is, by substituting different gear ratios in the bevel gearing. In order to readily vary the distance between the bunches of plants, the blades are detachably connected to the wheel so that by removing two diametrically opposite blades from the wheel the distances between the plants are halved.

The pinion 26 can be thrown out of gear with the gear 14 at any time by operating the lever 37. This lever will move the sections of the link 16 relatively to each other so as to lengthen and shorten the link and move the pinion 26 into and out of mesh with the gear 14. The right hand connection of the chopper frame to the link 15 is loose enough so that the left hand link may be lengthened and shortened in the manner and for the purpose described. It will be noted that the links 15 and 16, which carry the shaft 17 are mounted to swing about the axis of the gear 14, and therefore the gear and pinion will always remain in the relative position in which they have been placed.

The harrow may be adjusted at its forward end by means of the plurality of holes in the arms 44, and the harrow may be entirely raised out of the ground by means of the operating lever 49. It will be noted that by raising the rear end of the harrow not only the rear teeth but also the forward teeth are completely raised out of the ground. This is due to the fact that when the rear end of the harrow is raised the arms 44 will be raised toward a horizontal position, and therefore the front teeth will be swung upwardly as well as the rear teeth. In order to change the machine into a cultivator, the blades may be removed from the chopper wheel and blades of the type shown in Fig. 7 substituted. This machine provides therefore a construction in which all of the parts are adjustable and all of the operating mechanisms may be raised from the ground. The plants are cultivated by means of the harrow, and chopped out or blocked by means of the chopping wheel. Both the harrow and the chopping wheel frames are supported primarily at their forward ends so that they will drag and thus adapt themselves to inequalities in the soil. This construction moreover prevents any binding and breakage.

It is obvious that various changes may be made in the details of construction without departing from this invention, and it is, therefore, to be understood that this invention is not to be limited to the specific construction shown and described.

Having thus described the invention, what is claimed is:

1. In a machine of the class described, the combination with chopping mechanism, of a pivoted frame for supporting said mechanism, shoes on said frame, and means whereby said frame may be swung on said shoes as an axis, for the purpose set forth.

2. In a machine of the class described, the combination with chopping mechanism, of a frame for supporting said chopping mechanism, shoes on said frame located rearwardly of said mechanism, and means whereby the front of said frame may be raised and lowered to swing said frame on said shoes as an axis, for the purpose set forth.

3. In a machine of the class described, the combination with chopping mechanism, of a pivoted frame for supporting said mechanism, shoes on said frame, and an operating lever connected to said frame and arranged to swing said frame on said shoes as an axis, in order to regulate the depth of cut of said chopping mechanism.

4. In a machine of the class described, the combination with a rotary chopping wheel, of a frame for supporting said wheel, a pair of shoes located rearwardly of said wheel, and a lever for raising and lowering the forward end of said frame so as to swing said frame on said shoes as an axis.

5. In a machine of the class described, the combination with a rotary chopping wheel, of a frame for supporting said wheel, a pair of shoes located rearwardly of said wheel, a shaft for said wheel, coöperating driving bevel gears on said frame, and a lever connected to the forward end of said frame and constructed to swing said frame on said shoes as an axis.

6. In a machine of the class described, the combination with chopping mechanism, of a frame for supporting said chopping mechanism, shoes on said frame, means for supporting said frame on a horizontal pivot, a foot piece directly connected to said frame, whereby said frame may be swung about said pivot, and means for swinging said frame on said shoes as an axis.

7. In a machine of the class described, the combination with a main frame, an axle for said frame and wheels on said axle, of a chopping mechanism frame, chopping mechanism thereon located rearwardly of said axle, shoes located rearwardly of said chopping mechanism, means carried by the main frame and connected to the chopping mechanism frame for moving the last-named frame on the shoes as an axis, and means for supporting said second frame on a horizontal pivot forwardly of said chopping mechanism.

8. In a machine of the class described, the combination with a main frame, an axle for said frame and wheels on said axle, of a chopping mechanism frame, chopping mechanism thereon located rearwardly of said axle, shoes located rearwardly of said chopping mechanism, links connecting said axle and the forward end of said second frame, and means for raising and lowering said links.

9. In a machine of the class described, the combination with a main frame, an axle for said frame and wheels on said axle, of a chopping mechanism frame, chopping mechanism thereon located rearwardly of said axle, shoes located rearwardly of said chopping mechanism, links connecting said axle and the forward end of said second frame, and means whereby said frame may be swung about the points of connection with said links as an axis.

10. In a machine of the class described, the combination with a main frame, an axle for said frame and wheels on said axle, of a chopping mechanism frame, chopping mechanism thereon located rearwardly of said axle, shoes located rearwardly of said chopping mechanism, links connecting said axle and the forward end of said second frame, means for raising and lowering said links, and means whereby said frame may be swung about the points of connection with said links as an axis.

11. In a machine of the class described, the combination with a rotary chopping wheel, of a frame for supporting said wheel, a pair of curved resilient shoes located rearwardly of said wheel, a horizontal shaft for pivotally supporting the forward end of said frame, a shaft for said wheel, and bevel gears connecting said shafts.

12. In a machine of the class described, the combination with a main frame, of a chopping mechanism frame supported thereby, chopping mechanism on said frame, shoes on said frame rearwardly of said chopping mechanism, a shaft extending crosswise of said main frame, an operating lever on said shaft, arms on said shaft, and links connecting said arms and the forward end of said chopping mechanism frame.

13. In a machine of the class described, the combination with a main frame, of a chopping mechanism frame, chopping mechanism on said frame, links connecting said frames, shoes on said frame rearwardly of said chopping mechanism, a shaft extending crosswise of said main frame, an operating lever on said shaft, arms on said shaft, and links connecting said arms and the forward end of said chopping mechanism frame.

14. In a machine of the class described, the combination with a main frame, of a chopping mechanism frame, chopping mechanism on said frame, links connecting said frames whereby said second frame may swing about the points of connection of said links as an axis, shoes on said frame rearwardly of said chopping mechanism, a shaft extending crosswise of said main frame, an operating lever on said shaft, arms on said shaft, and links connecting said arms and the forward end of said chopping mechanism frame.

15. In a machine of the class described, the combination with a main frame, of a chopping mechanism frame supported thereby, chopping mechanism on said frame, shoes on said frame rearwardly of said chopping mechanism, a shaft extending crosswise of said main frame, an operating lever on said shaft, arms on said shaft, links connecting said arms and the forward end of said chopping mechanism frame, and sector guides for the last named frame extending from said main frame.

16. In a machine of the class described, the combination with a main frame, of driving wheels thereon, a gear connected to said wheels, a pivoted second frame, rotary chopping mechanism thereon, driving means for said chopping mechanism including a pinion meshing with said gear, and links connecting said frames, said links being connected with said main frame at the axis of said gear.

17. In a machine of the class described, the combination with a main frame, of driving wheels thereon, a gear connected to said wheels, a second frame, chopping mechanism thereon, driving means for said chopping mechanism including a pinion meshing with said gear, links connecting said frames, said links being connected with said main frame at the axis of said gear, and a foot piece connected to said second frame forwardly of its connection with said links, whereby said second frame may be swung about said connection as a pivot.

In testimony whereof we affix our signatures in presence of two witnesses.

ROBERT A. ERWIN.
WALLAS R. LONG.

Witnesses:
Roy M. Neil,
C. M. Cobb.

---

Copies of this patent may be obtained for five cents each, by addressing the "Commissioner of Patents, Washington, D. C."